April 3, 1934.   E. T. BYSSHE ET AL   1,953,528
CHASER
Filed May 15, 1929   2 Sheets-Sheet 2
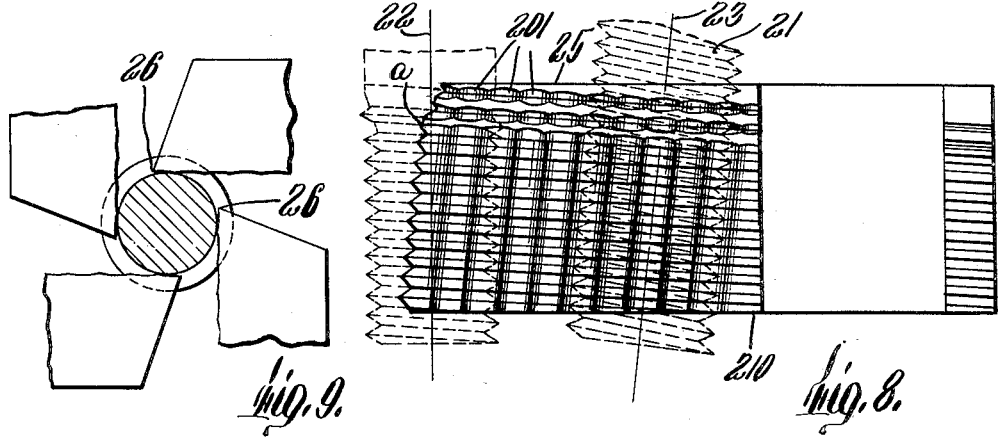
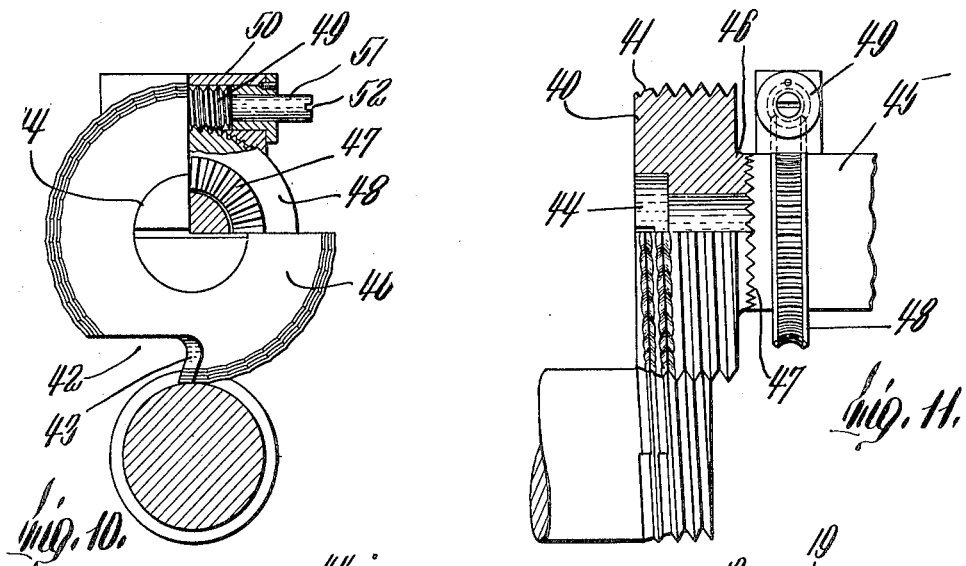
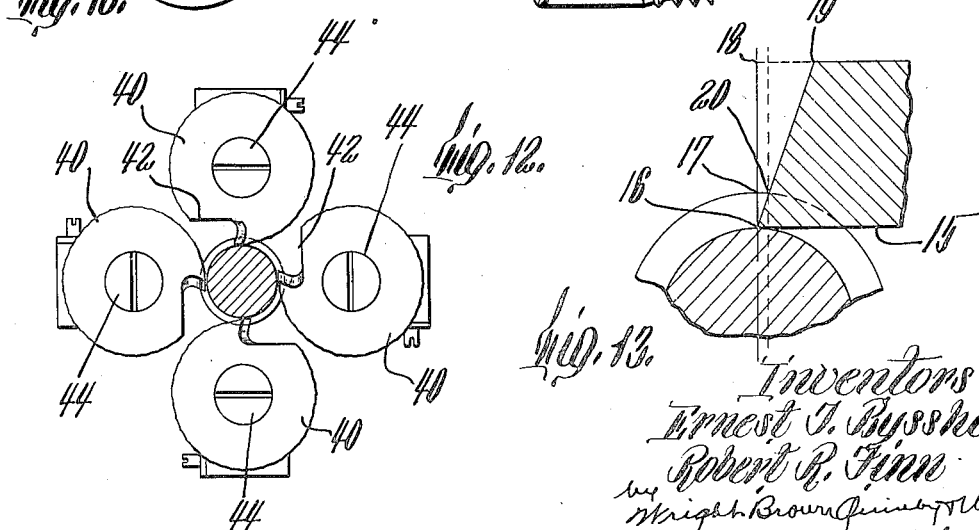
Inventors
Ernest T. Bysshe
Robert R. Finn Patented Apr. 3, 1934

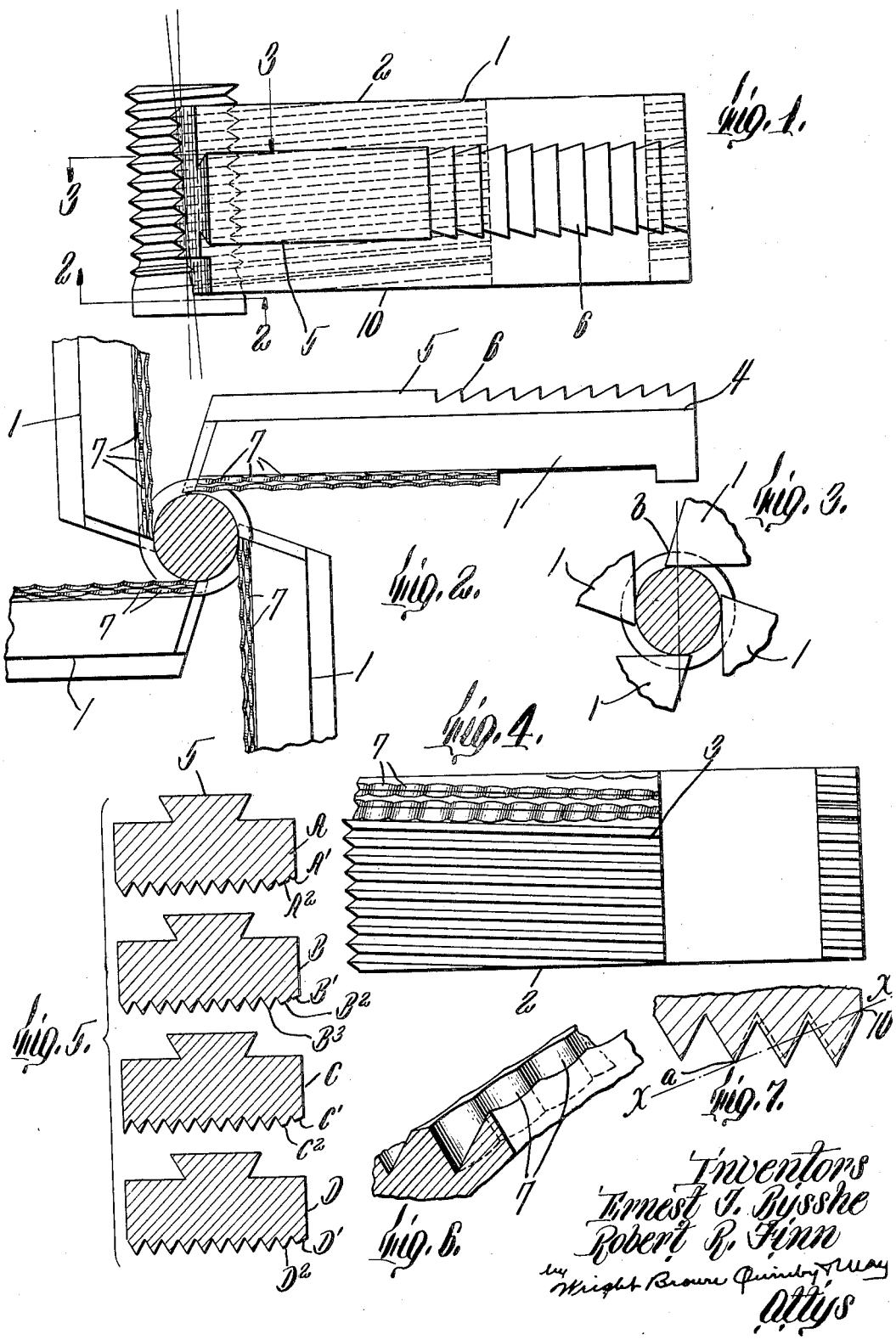

1,953,528

UNITED STATES PATENT OFFICE 1,953,528

CHASER

Ernest T. Bysshe and Robert R. Finn, Springfield, Vt., assignors to Jones & Lamson Machine Company, Springfield, Vt., a corporation of Vermont Application May 15, 1929, Serial No. 363,303

13 Claims. (Cl. 10—111)

This invention relates to chasers, more particularly of the tangent type, for cutting screw threads. A chaser of this type as commonly formed comprises a bar having one face provided with substantially longitudinal ridges and valleys corresponding in cross sectional contour to the threads to be cut, this side face being positioned substantially tangentially to the work, and the cutting edges being formed at the junction of these ridges and valleys with the inner end of the bar which must be located at the proper point with relation to the line of tangency of the bar with the work so as to properly act on the work. This proper point depends on the material and character of the work and cannot be departed from materially without impairing the quality of the threads. The first thread points of a chaser to be presented to the work are cut back or chamfered to progressively less extents away from the first point so as to divide the work of cutting between them, the first taking a relatively light cut in the work and the next few succeeding removing more stock until the threaded work is cut to final size. The full size thread points thereafter merely ride between the fully cut threads of the work and act as a nut to push the cutting thread points onto the work as the chasers and work are moved relatively in cutting direction. The tangent type of chaser has the great advantage that it may be sharpened by merely grinding off the front end of the tool to present fresh cutting edges instead of requiring cutting off to accurate shape of the ridged faces. Some material, such as brass, requires no top rake on the cutting tool, so that the end face of the chaser bar may be cut perpendicular to its length. In such cases all the thread points of a chaser whether the more or less complete cutting points or the complete guiding points which do no cutting, but ride between the completed threads, lie in the same relation to the point of tangency between the chaser and the work. Many materials, however, require that the cutting tool or chaser be given "top rake" so that the end of the chaser must be cut on a backward slope, the angle between the edge face and the ridged side being less than 90°. When this is necessary the ends of the shorter cutting points lie back of the longer points in the direction of length of the chaser so that when there is a single line of tangency between the tool and the work only one of these cutting points can be at exactly the proper position relative thereto, all the others being more or less forward or rearward from this position, depending on whether they are more or less than the given thread point of complete thread valley configuration.

In accordance with the present invention the tool is so formed as to be substantially tangent to the work over a substantial distance rather than at a line only, this being accomplished by forming a concavity on the work-engaging face which cuts the thread flanks and of substantially the curved contour of the thread cut. A series of such concavities may be made on the ribbed face of each chaser these concavities being brought into use successively as when the cutting points at the edge of one concavity become dull the chaser may be ground away until the edge of the next concavity is reached. These concavities may be formed by lapping and preferably this lapping of the concavities is so effected that the guiding thread points extend beyond the cutting position adjacent to the arc of tangency of the chaser on the work. This may be accomplished by either of two methods. One consists in lapping to a size larger than the work but at such an angle larger than the helix angle that when the cutting points are in proper position, the guiding points extend beyond and are raised from the work. The other and usually preferred method consists in grinding back the cutting point portion further than the guiding point portion and initially forming the ridges, the edge of which form the cutting points outwardly offset relative to the others so that after lapping to form the concavities, the deepest parts of the concavities lie in substantially the same plane as the roots of the unconcaved ridges. Where this is done the angle of the lap may be substantially the same as that of the work with relation to the ridges and need not be greater than the helix angle as in the first method mentioned. This second method saves considerable of the necessary lapping to produce the desired concavities and permits the use of a lap of smaller size, substantially as small as the work, presented at the correct helix angle to the chaser.

For a more complete understanding of these and other features of this invention reference may be had to the accompanying drawings in which Figure 1 is a top plan of one form of chaser constructed according to this invention.

Figures 2 and 3 are fragmentary sections through the work on opposite sides of the chaser showing a set of four chasers, the sections being taken substantially on the lines 2—2 and 3—3, respectively, of Figure 1.

Figure 4 is an inverted plan of the chaser shown in Figure 1.

Figure 5 is a cross sectional view of each of the chasers of a set.

Figure 6 is a detail in perspective showing the faces of certain of the cutting teeth.

Figure 7 is a sectional detail of a portion of the chaser before it is given its finished contour.

Figure 8 is a view similar to Figure 4, but showing a modified construction.

Figure 9 is a view similar to Figure 3, but showing the chaser construction of Figure 8, the positions of the work and a lap being shown in dotted lines.

Figures 10 and 11 are face and side views, respectively, partly in section showing a further modification.

Figure 12 is a view similar to Figure 2, but showing chasers of the form shown in Figures 10 and 11.

Figure 13 is a diagrammatic view showing the effect of top rake on a tangent chaser.

Referring first to Figures 1 to 7, at 1 is indicated a chaser comprising a flat bar having on one side as at 2 a flat gaging face which is intended to be held against a corresponding flat face of the die which holds the chasers, these faces being perpendicular to the axis of the work in which threads are to be cut. A longitudinal face at right angles to the gaging face 2 is provided with a series of ridges and valleys as at 3, the ridges being of the contour of the thread valleys which it is desired to cut in the work, these ridges extending in a general longitudinal direction on the bar, but preferably, as shown, at an angle to the gaging face 1 corresponding to the helix angle of the threads which it is desired to cut, this helix angle, of course, depending on the number and size of the threads and the diameter of the work. The face of the bar opposite to the ridged face 3, as at 4, is shown as provided with a longitudinal extending dovetail portion 5 which for accuracy of work should be ground and lapped to exact dimensions. A portion of the dovetail 5 toward the rear end of the chaser is shown as provided with accurately formed notches or ratchet like serrations 6 which may be employed to gage the extent of grinding by definite increments when the chaser is being sharpened, these increments corresponding to the distances between the meeting edges of a series of concavities 7 formed in the ridge face 3 of the chaser substantially mating the curved contours of the thread cut. Such notches may also be of utility even though no concavities are formed as they facilitate setting of the chasers for grinding and then resetting in the die, the stock being ground off at each sharpening added to that worn off in use since the previous sharpening being made equal to the space between corresponding surfaces of succeeding notches. By replacing the chaser after each grinding with the gaging face next rearward from that last used before the grinding in the same definite position relative to the die, the cutting edge will then be positioned in the same place after each grinding. Preferably the chasers are so mounted that they can be adjusted endwise micrometrically, as shown for example in our application for Patent Serial No. 352,107 filed April 3, 1929, for Automatic dies, so that these cutter points can be brought readily into most effective positions. As shown best in Figure 4, these concavities 7 extend across the first few ridges and valleys remote from the face 2 of the chaser, and in order that it may be unnecessary to extend these concavities further than the first few teeth, which, as will later appear, do all the cutting, they may initially be formed outwardly offset from the remainder of the ridges as shown in full lines in Figure 7, the outwardly offset portion extending from the point a to the side face 10 of the chaser. The concavities 7 which are then lapped on the ridges between a and the face 10 may then be formed to their desired depth at which time their deepest portions will be substantially in the same plane as the deepest portions of the remaining parts of the rib faces. The concavities may be formed by a threaded lap substantially the size of or slightly larger than the work and if of substantially the same size, the lap should be arranged substantially parallel to the position which the work will occupy when the chaser is acting thereon so that the concavities will be of substantially the same curvature as the corresponding periphery of the work. The ridges are chamfered off as on the line x—x.

The function of these concaved faces will now be further explained, comparing particularly Figure 13 with Figures 2 and 3. In Figure 13 the line at 15 indicates the extreme lower edge of the thread forming portion of a chaser which forms the bottom of the valley between the threads as at the point 16. The first point to make a cut on the work must, of course, bear on the work near its outer diameter which is indicated at 17 and the points thereafter cut progressively deeper from the outside diameter 17 of the work to the minimum diameter point 16 at the root of the finished thread. At 18 is indicated the point of tangency between the face 15 of the chaser and the work. If there is no top rake to the chaser its front face extends perpendicularly to the face 15 and lies entirely in a plane in or parallel to the diametrical plane of the work which passes through the point 16. If the cutting teeth operate best when positioned at the point of tangency, when the tool has no top rake all the cutting teeth from the first to cut to the final one which cuts to the maximum depth, lie at the point of tangency between the chaser and the work. If, however, the front face of the chaser is cut back as shown at 19 to give top rake, the first tooth to cut strikes the work adjacent to the point 20 which is back of the line of tangency by the distance between the points 20 and 17 and if the proper position for effective cutting is at tangency the first tooth to cut will not be at the proper point and hence will not properly cut the work. In such a situation the cutting points first coming into action will not cut properly so that the partial tooth contours produced thereby will not be true and smooth and the points coming successively thereafter into operation may be more or less disturbed in their cutting action by reason of the irregular surface into which they must engage in performing their portion of the work. If it be attempted to cause the first cutting teeth to form better cuts by positioning them closer to the point of tangency, the later acting more complete cutting points are positioned beyond the point of tangency and out of their proper cutting positions. Therefore only one cutting point and one part only of this point can be in exactly proper position, any cutting points acting earlier being back of the proper cutting position and those cutting thereafter being forward of the proper position. By forming the concavities 7, however, the tangency between the chaser and the work is extended over substantially the arc of the concavity so that all the cutting points can be positioned correctly with relation to the tangent engagement, the variation in engagement of the cutting points on the work being only in the effective angle of top rake which varies slightly as the point of action of the various cutting points varies along the length of the contour arc. This, however, is relatively unimportant when compared to the importance of correctly positioning the cutting teeth with relation to the point of tangency. Thus the first points to cut act at the rear portions of the arcs while those more nearly complete act at the forward portions of these arcs and by proper positioning of the chaser lengthwise these teeth may be brought into their best cutting relations for the particular work being operated upon. The length of the concavities is dependent upon the size of the work, the size of the threads, and the angle of top rake which it is desired to give to the tool, it being essential for effecting the most complete cutting perfection that the arc be sufficient to insure the proper relation to tangency of all the cutting teeth from the first fragmentary points to those which form the final cut of the desired contour.

Where the concavities are formed only in the few ridges at the ends of which the cutting teeth are formed and the apices of which are chamfered off to progressively less extent from the first tooth to cut until the complete thread contour is formed, it is preferable that the remaining ridges from the point $a$ to the face 2 of the chaser be extended beyond the cutting portion, this being shown in Figures 1 and 2. This results in the guiding ridges extending beyond their points of tangency with the work and with their extremities out of engagement therewith as shown best in Figure 3, the points of tangency being indicated at $b$. This prevents any possible cutting action of these ridges on the work and provides a good guiding contact to cause these ridges to act as a nut on the threads already formed on the work, as is shown in Figure 1, so as to press the cutting edges from $a$ to the face 10 into the uncut portion of the work.

In Figure 5 is shown the ridge portions of each chaser of a set of four which illustrates the manner in which the cutting points become successively more nearly complete thread valley contours, starting from the first tooth of the first chasers A', then the first teeth B', C' and D' of the chasers B, C and D in succession, then the second teeth $A^2$, $B^2$, $C^2$, $D^2$ of the chasers in the same order, and so on until the complete thread form is reached which as shown is at the third thread tooth $B^3$ of the B chaser after which all the ridges become merely guiding ridges engaging between the threads already cut in the work.

In Figure 6 is shown the manner in which the concavities 7 extend across the entire flanks of the cutting tooth ridges.

In Figures 8 and 9 is shown a modified construction of chaser in which the concavities are extended across the full width of the ridged face but in order that the non-cutting ridges may act as a nut and be out of cutting relation with the work, the concavities shown at 201 are formed by the use of a lap of somewhat larger diameter than the work, this lap being shown in dotted lines at 21, and arranged at a greater angle to the ridges than the helix angle, this angularity being evident from an inspection of the axis of the work at 22 and the axis of the lap at 23. By using a lap larger than the work and arranging it at a greater angle than the helix angle, when the cutting point portion from $a$ to the gaging face 25 of the chaser is in cutting relation, the opposite edge face 210 is so related to the finished threads of the work that the forward ends of the guiding ridges are out of contact with the work as shown at 26 in Figure 9. The larger diameter lap would lose something of the helix angle if presented directly parallel with the work, but by turning this beyond the angle of the work axis, the proper helix angle is brought back so that the cutting teeth properly engage the work, the engaging curvatures of the chaser being substantially that of the work periphery, but the work is so positioned relative to the concavities that the cutting point portion is in cutting relation to the work while the points further removed from the cutting point portion are progressively further away from the work. This causes the guiding ridges, particularly those more remote from the cutting ridges to extend well beyond the point of tangency of the work in a manner similar to the guiding ridges in the form of chaser shown in Figures 1 to 6 and which are made longer than the cutting ridges.

In Figures 10, 11 and 12 a modified construction is shown in which the concave ridged faces which form the cutting and guiding points of the chaser are formed on the periphery of a disk element 40. Adjacent to one end face of this disk the ridges are cut away as at 41 (see Figure 11) to form the first cutting teeth and one portion of the periphery is cut away as at 42, the wall 43 of the cut away portion forming with the ends of the ridges the cutting and guiding portions which cut or ride on the work as shown in Figures 10 and 12. In Figure 12 four such chasers in set are shown as working on a single piece of work. Each of these chasers may be fixed as by means of a screw 44 to the outer end of a rotary shaft 45 suitably journaled in the die (not shown). In order that the chasers may be held in proper angular relation to the shafts 45 a hub portion 46 on each chaser and the outer end of the shaft 45 may be formed with radially arranged mating serrations 47. Each of the chasers is preferably mounted so that it may be adjusted angularly as required so as to present the cutting faces in proper relation to the work and to present different cutting faces as the faces wear and the faces of the cut away portion are ground back from concavity to concavity. For this purpose each of the shafts 45 may be provided with a worm gear 48 with which meshes a worm 49 journaled in a suitable stationary housing 50, the worm 49 being provided with a short shaft 51 having a screwdriver slot 52 in its outer end to facilitate rotation of the worm to adjust its chaser. The concavities might be formed either entirely across the peripheral face of the chaser in a similar manner to that shown in Figure 8, or they may be formed over the cutting tooth portion only in a manner similar to that described for the chasers shown in Figures 1 to 6.

From the foregoing description of certain embodiments of this invention, it should be evident to those skilled in the art that various changes and modifications might be made without departing from the spirit or scope of this invention as defined by the appended claims.

We claim:

1. A chaser of the tangent type comprising a bar having ridges running substantially longitudinally of one side face and forming thread cutting and guiding points at one end, said face having a plurality of concave surfaces extending laterally of at least some of and on said ridges for engagement with the work.

2. A chaser of the tangent type comprising a bar having ridges running substantially longitudinally of one side face and forming thread cutting and guiding points at one end, said cutting ridges only having a plurality of concave work engaging surfaces extending laterally thereof.

3. A chaser comprising a bar having ridges running substantially longitudinally of one side face and forming thread cutting and guiding points at one end, said face having a plurality of concave surfaces for engagement with the work arranged side by side and extending laterally of and on said ridges.

4. A chaser of the tangent type comprising a bar having ridges running substantially longitudinally of one side face and forming thread cutting and guiding points at one end, said cutting ridges only having a plurality of concave work engaging surfaces arranged side by side and extending laterally thereof.

5. A chaser of the tangent type having a ridged face presenting a plurality of concave surfaces extending side by side laterally of certain of the ridges, said chaser having a plurality of gaging elements spaced in accordance with said concave faces to facilitate removal of stock in sharpening by definite increments to present successive cutting edges having the same relation to their respective adjacent concave surfaces.

6. A chaser of the tangent type comprising a bar having ridges forming thread cutting and guiding elements at one end, said cutting elements being chamfered off at their apices to progressively less extent, the side faces of said cutting ridges which form the thread flanks having concave surfaces substantially conforming to the curved contours of the thread cut.

7. A chaser having a ridged face, certain of the ridges having thread cutting edges and the remainder of said ridges engaging in the valleys formed in the work by said cutting edges, those ridges only which have cutting edges being concaved to substantially the curved contours of the thread cut.

8. A chaser having a ridged face, certain of the ridges having thread cutting edges and the remainder of said ridges engaging in the valleys formed in the work by said cutting edges, those ridges only which have cutting edges being concaved to substantially the curved contours of the thread cut and having the end portions of the concavities extended outwardly beyond the other of said ridges.

9. A chaser comprising a bar having a ridged face, certain of said ridges forming thread cutting points at one end and the remainder of said ridges riding between the cut threads and guiding the chaser onto the work, said certain ridges only being concaved to substantially conform to the curved contours of the thread cut, and the remainder of said ridges being extended forwardly of said cutting points whereby the guiding ridges extend past their lines of contact with the threads of the work when said cutting ridges are in cutting relation thereto.

10. A chaser comprising a bar having ridges on one face, certain of said ridges having thread cutting points at one end, said certain ridges only being concaved to substantially the curved contours of the thread cut, the bases of said concavities being substantially on the plane level of the bases of the valleys between the non-concaved ridges.

11. A chaser of the tangent type comprising a bar having ridges on one side face, certain of said ridges forming thread cutting points at one end, said certain ridges only being concaved to substantially the curved contours of the thread cut, the bases of said concavities being substantially on the plane level of the bases of the valleys between the non-concave ridges, said concavities being arranged side by side longitudinally along said bar.

12. A chaser of the tangent type comprising a bar having ridges on one side face, certain of said ridges forming thread cutting points at one end, said certain ridges only being concaved to substantially the curved contours of the thread cut, the bases of said concavities being substantially on the plane level of the bases of the valleys between the non-concave ridges, said concavities being arranged side by side longitudinally along said bar, and gaging faces spaced in accordance with said concavities along another face of said bar.

13. A chaser having a ridged face, certain of said ridges having thread cutting edges at their ends, and others of said ridges engaging in the thread valleys cut by said edges and extending forwardly of said edges and at said extended portions being out of contact with the work, said certain ridges only being concaved to conform substantially to the curved contours of the thread cut.

ERNEST T. BYSSHE.
ROBERT R. FINN.